United States Patent [19]
Matsui et al.

[11] Patent Number: 6,122,072
[45] Date of Patent: *Sep. 19, 2000

[54] DATA COMMUNICATION APPARATUS

[75] Inventors: Akira Matsui, Tokyo; Toru Maeda, Mitaka; Hitoshi Saito, Yokohama; Makoto Kobayashi, Yokohama; Seiji Ohmori, Yokohama, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/683,177

[22] Filed: Jul. 18, 1996

Related U.S. Application Data

[63] Continuation of application No. 08/352,740, Dec. 2, 1994, abandoned.

[30] Foreign Application Priority Data

| Dec. 6, 1993 | [JP] | Japan | 5-305305 |
|---|---|---|---|
| Dec. 6, 1993 | [JP] | Japan | 5-305310 |
| Dec. 8, 1993 | [JP] | Japan | 5-308044 |

[51] Int. Cl.[7] ............... H04N 1/00; H04N 1/36
[52] U.S. Cl. ..................... 358/434; 358/412
[58] Field of Search ............... 358/400, 434, 358/435, 436, 405, 407, 412, 425, 442; 370/235, 912

[56] References Cited

U.S. PATENT DOCUMENTS

| 4,668,994 | 5/1987 | Takahashi et al. ............. 358/256 |
|---|---|---|
| 4,736,249 | 4/1988 | Iizuki et al. ............. 358/435 |
| 4,999,716 | 3/1991 | Nakamura ............. 358/434 |
| 5,065,254 | 11/1991 | Hishida ............. 358/400 |
| 5,125,025 | 6/1992 | Lim ............. 358/434 |
| 5,208,682 | 5/1993 | Ahmed ............. 358/434 |
| 5,216,519 | 6/1993 | Daggett et al. ............. 358/434 |
| 5,274,474 | 12/1993 | Medina ............. 358/435 |
| 5,301,035 | 4/1994 | Hayafune ............. 358/440 |
| 5,303,066 | 4/1994 | Kawaguchi ............. 358/434 |
| 5,351,134 | 9/1994 | Yaguchi et al. ............. 358/435 |
| 5,406,388 | 4/1995 | Matsuzaki ............. 358/434 |
| 5,457,715 | 10/1995 | Sakaki et al. ............. 375/260 |
| 5,661,568 | 8/1997 | Ueno ............. 358/440 |
| 5,877,870 | 3/1999 | Sakai ............. 358/434 |

FOREIGN PATENT DOCUMENTS

| 62-39964 | 2/1987 | Japan . |
|---|---|---|
| 1-192261 | 8/1989 | Japan . |
| 5-22553 | 1/1993 | Japan . |

*Primary Examiner*—Madeleine Nguyen
*Attorney, Agent, or Firm*—Fitzpatrick, Cella, Harper & Scinto

[57] ABSTRACT

In a data communication apparatus, when performing a calling operation, an image transmission speed is assigned using a CCITT nonstandard reception command NSS after transmitting a dial signal, and the NSS is repeatedly transmitted at a predetermined time interval. Upon reception of a reception-preparation-confirming signal transmitted from an apparatus of a communication partner, a command, an identification signal and image data are transmitted at the image transmission speed based on information relating to the communication partner's apparatus which has been stored, so that the time required for communication procedures is shortened.

12 Claims, 22 Drawing Sheets

DATA COMMUNICATION APPARATUS

This application is a continuation of application Ser. No. 08/352,740 filed Dec. 2, 1994, which is now abandoned.

BACKGROUND OF THE INVENTION

1. Field of the Invention

This invention relates to a data communication apparatus which performs data communication according to communication procedures.

2. Description of the Related Art

For example, a facsimile apparatus has been known as an apparatus of this kind.

Conventional standard facsimile communication procedures comprise, as provided in CCITT (Comité Consulatif International Télégraphique and Téléphonique) recommendation T.30, communication of a low-speed (300 bps (bits per second)) communication control code portion and communication of a high-speed (2400–9600 bps, or higher if possible) image data portion. FIG. 2 illustrates communication procedures of T.30.

In communication using communication procedures provided by CCITT recommendation T.30, communication time is determined by the amount of data of the image data portion.

Even if the amount of image data is reduced using an encoding method having a high compression ratio, such as an MR method or the like, there is a limitation in data compression. Therefore, there is also a limitation in the reduction of the time required for communication. The situation is the same for communication procedures in a polling operation shown in FIG. 12.

In order to overcome such problems, the assignee of the present application has proposed, in U.S. patent application Ser. No. 07/857,313 (filed Mar. 25, 1992), a technique for reducing the time required for communication procedures. In this technique, a calling side receives 300-bps NSF (nonstandard facilities), CSI (called subscriber identifcation) and DIS (digital identification signal) from a called side. When it has become clear that the called side has particular communication procedures, the calling side transmits 300-bps NSS (nonstandard facilities set up) to the called side, and then performs communication of a communication-procedure signal at the same high transmission speed as that of an image signal.

In the above-described technique, however, since the calling side shifts to the high-speed communication procedures after receiving low-speed communication procedures from the called side, the time required for communication procedures is not sufficiently reduced.

SUMMARY OF THE INVENTION

The present invention has been made in consideration of the above-described problems.

It is an object of the present invention to provide an improved data communication apparatus.

It is another object of the present invention to provide a data communication apparatus in which the time required for communication procedures is short.

It is still another object of the present invention to provide a data communication apparatus or a data communcation method which shifts to high-speed communication procedures without reception of a low-speed communication-procedure signal from a called side by a calling side.

According to one aspect, the present invention, which achieves these objectives, relates to a data communication apparatus having a first mode of communicating a communication protocol signal at a low communication speed and a second mode of communicating a communication protocol signal at a high communication speed, comprising means for transmitting a signal indicating the second mode to a destination in response to a calling instruction, means for receiving a confirmation signal corresponding to the indicating signal from the destination, and control means for executing the second mode in response to the confirmation signal.

According to another aspect, the present invention relates to a data communication apparatus having a first mode of communicating a communication protocol signal at a low communication speed and a second mode of communicating a communication protocol signal at a high communication speed, comprising means for receiving a signal indicating the second mode after detecting a calling signal, means for transmitting a confirmation signal to a destination in response to the indicating signal, and control means for executing the second mode after transmitting the confirmation signal.

According to still another aspect, the present invention relates to a data communication method selectively executing one of (1) a first mode of communicating a protocol signal at a low speed and (2) a second mode of communicating a protocol at a high speed, comprising the steps of transmitting a signal indicating the second mode, to a destination, in response to a calling instruction, receiving a confirmation signal, corresponding to the indicating signal, from the destination, and executing the second mode in response to the confirmation signal.

According to yet another aspect, the present invention relates to a data communication apparatus having a function of storing communication information, comprising a modem rate and the like, for each of communication partners registered in one-touch dials or abbreviation dials, comprising means for transmitting a protocol signal, for assigning a data transmission speed, when performing a calling operation, means for receiving a confirmation signal for the protocol signal, and means for transmitting a command, an identification signal and data at the data transmission speed, based on information relating to a receiver of a communication partner, in response to the confirmation signal.

According to yet a further aspect, the present invention relates to a data communication method comprising the steps of transmitting a protocol signal, for assigning a data transmission speed to a communication partner, without awaiting a protocol signal from the communication partner, when performing a calling operation, receiving a confirmation signal corresponding to the transmitted protocol signal from the communication partner, and transmitting data at the assigned data transmission speed in response to the reception of the confirmation signal.

According still a further aspect, the present invention relates to a data communication method comprising the steps of detecting the reception of a protocol signal for assigning a data transmission speed from a communication partner without transmitting a protocol signal during a predetermined time period after catching a network when a call has been received, transmitting a confirmation signal to the communication partner when the protocol signal has been received during the predetermined time period, and receiving data at the data transmission speed assigned by the protocol signal after transmitting the confirmation signal.

The foregoing and other objects, advantages and features of the present invention will become more apparent from the following detailed description of the preferred embodiments taken in conjuction with the accompanying drawings.

DETAILED DESCRIPTION OF THE PREFERRED EMBODIMENTS

Preferred embodiments of the present invention will now be described in detail with reference to the drawings.

In the following embodiments, a description will be provided illustrating a facsimile apparatus as a data communication apparatus.

Figure 1:
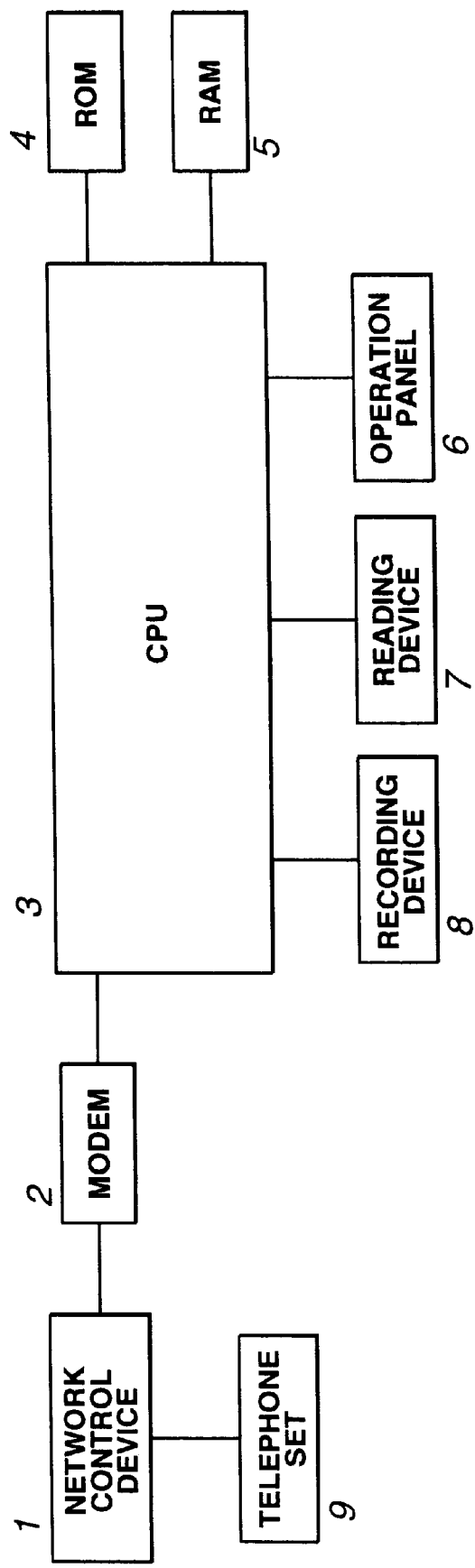
FIG. 1 is a block diagram illustrating the configuration of a facsimile apparatus according to the present invention.
Figure 2:
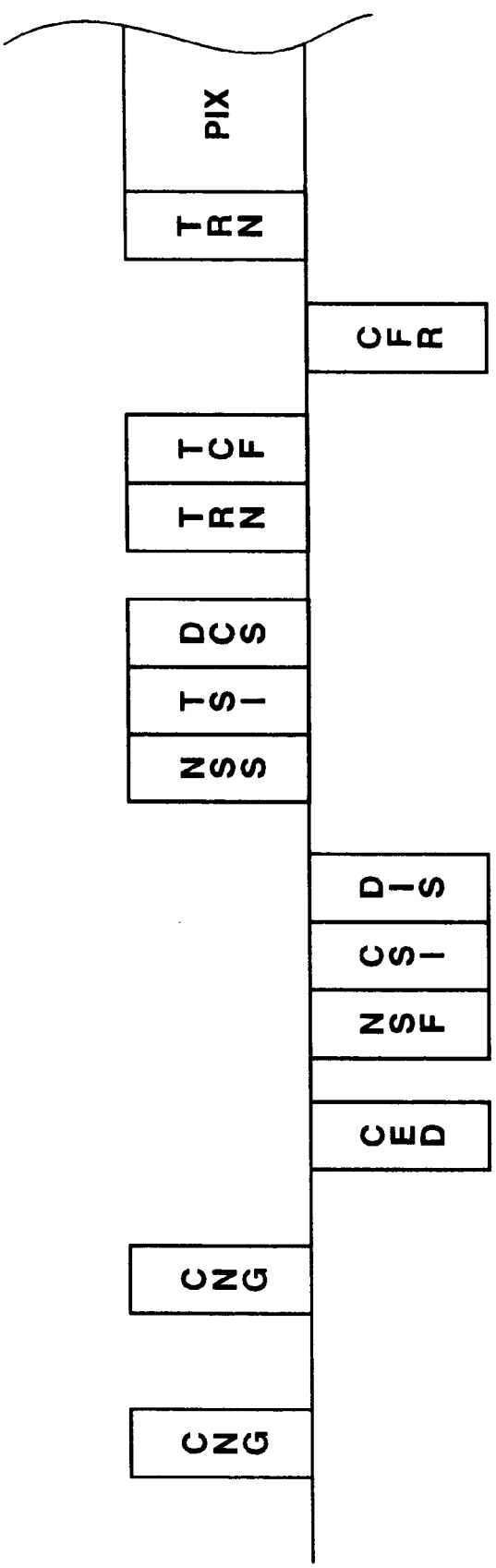
FIG. 2 is a diagram illustrating communication procedures conforming to a conventional communication procedure method T.30.

FIG. 1 is a block diagram illustrating the configuration of the facsimile apparatus of the present invention.

In FIG. 1, a network control device 1 controls a public communication network. A modem 2 modulates and demodulates digital signals and analog signals. A CPU 3 controls the entire facsimile apparatus. A ROM (read-only memory) 4 stores programs. A RAM (random access memory) 5 serves as work areas. An operation panel 6 receives various kinds of operations. A reading device 7 reads originals. A recording device 8 prints information on recording paper. A telephone set 9 is used for performing communication.

Figure 10:
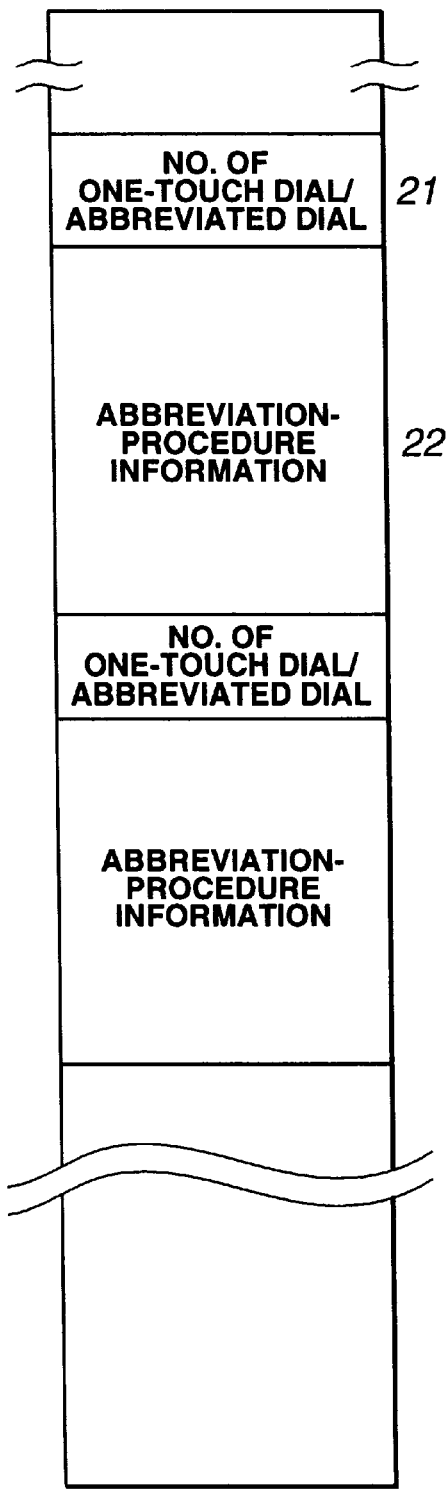
FIG. 10 illustrates data of information relating to a communication partner for each one-touch dial/abbreviated dial stored in a RAM 5 shown in FIG. 1.

FIG. 10 illustrates information, which will be used before starting communication, relating to a communication partner's apparatus corresponding to a one-touch dial or an abbreviated dial stored in the RAM 5. The information is stored in a region 20 of the RAM 5 (hereinafter termed a "Region 20"). A region 21 for storing the number of a one-touch dial or an abbreviated dial, and a region 22 for storing abbreviation-procedure information including information of the communication partner's apparatus are provided in the Region 20.

Figure 11:
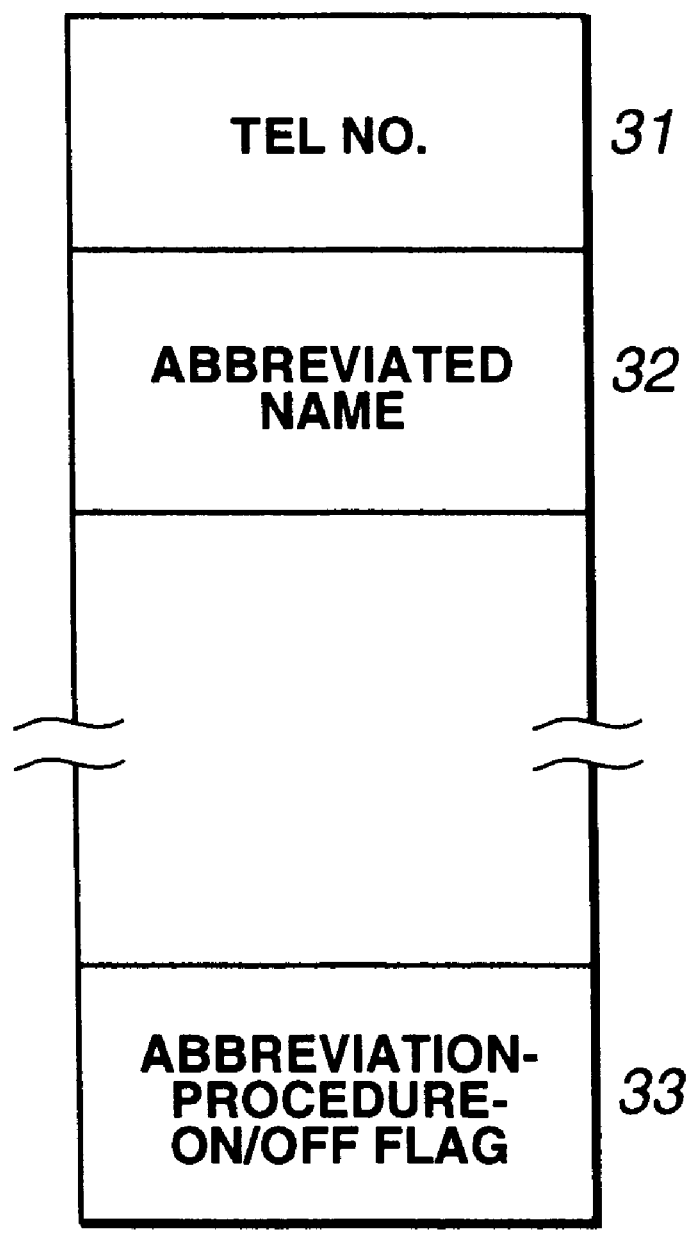
FIG. 11 illustrates data of information relating the telephone number, the abbreviated name and the like of a communication partner, and if the communication partner's facsimile can execute abbreviation procedures, for each one-touch dial/abbreviated dial stored in the RAM 5.
Figure 12:
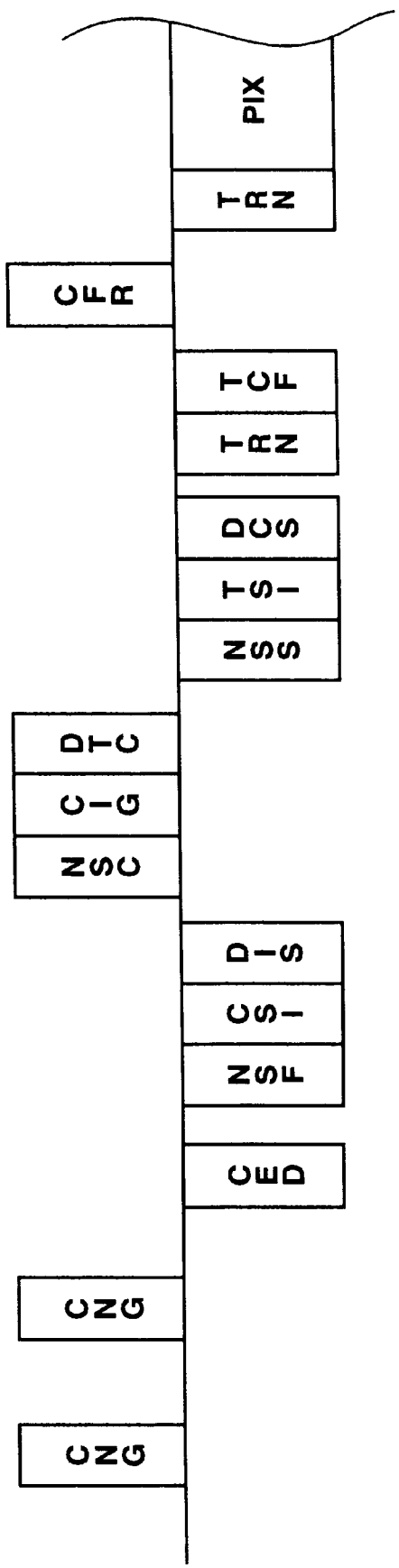
FIG. 12 is a diagram illustrating polling communication procedures conforming to the conventional communication procedure method T.30.

Calling-information data 30, each of which is used for the corresponding number of a plurality of one-touch/abbreviated dial numbers 21 in a calling operation, is provided in the RAM 5. FIG. 11 illustrates the details of the calling-information data 30. In FIG. 11, a region 31 stores the telephone number of a communication partner corresponding to the number of each one-touch/abbreviated dial. A region 32 stores the abbreviated name of the communication partner. A region 33 stores a flag indicating if the communication partner's apparatus has a function of executing abbreviation procedures.

The operator inputs the communication partner's telephone number 31, the communication partner's abbreviated name 32, and the abbreviation-procedure-on/off flag 33, by operating the operation panel 6 shown in FIG. 1, and stores these data in the RAM 5. When the operator has set the abbreviation-procedure-on/off flag 33 to ON, the abbreviation-procedure-on/off flag 33 is set to ON in a first communication operation with a communication partner. However, when it has been impossible "to communicate a training signal, transmission information and image data at a high transmission speed for image transmission" (to be described later) with the communication partner's apparatus while communicating image data, the abbreviation-procedure on/off flag 33 is set to OFF. When the operator has set the abbreviation-procedure on/off flag 33 to ON, and the abbreviation-procedure on/off flag 33 has been set to OFF due to a communication error, the abbreviation-procedure-on/off flag 33 is set to ON after the execution of errorless communication operations a predetermined number of times. When the operator has set the abbreviation-procedure-on/off flag 33 to OFF, the abbreviation-procedure-on/off flag 33 remains OFF even after the execution of errorless communication operations the predetermined number of times.

Figure 4:
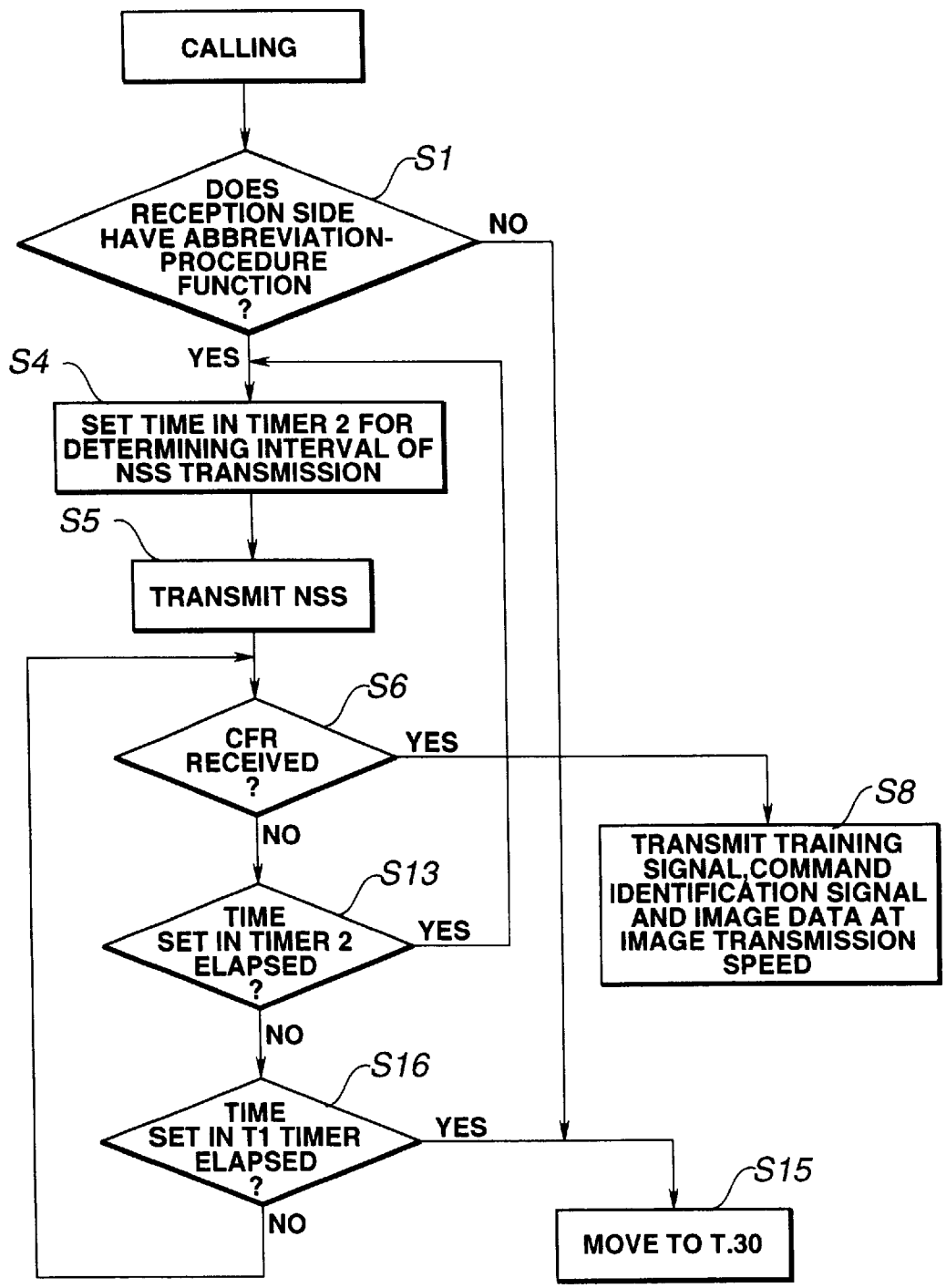
FIG. 4 is a flowchart illustrating the operation of the first embodiment.

Next, a description will be provided of the operation of a first embodiment of the present invention with reference to the flowchart shown in FIG. 4. FIG. 4 is the flowchart illustrating the control operation of the CPU 3 in the first embodiment.

In FIG. 4, when a calling operation has been instructed from a one-touch/abbreviated dial, the calling operation is performed by reading the corresponding telephone number 31 from the RAM 5. After the calling operation, if the abbreviation-procedure information 33 of the calling-information data 30, of the one-touch/abbreviated dial, is OFF (i.e., the communication partner's apparatus does not have an abbreviation-procedure function) in step S1, the process is branched to step S15 for performing conventional T.30 communication procedures for transmitting a CNG. If the abbreviation-procedure information 33 is ON (i.e., the communication partner's apparatus has an abbreviation-procedure function) in step S1, the succeeding steps are executed. The transmission side sets a time (for example, 2–3 seconds) in a timer 2 for determining the interval of NSS transmission (step S4), refers to the abbreviation-procedure information 22, which has been stored in the RAM 20, for each one-touch/abbreviated dial, inputs the highest image transmission speed which can be received by the receiver to an NSS, and transmits the NSS in step S5.

Figure 3:
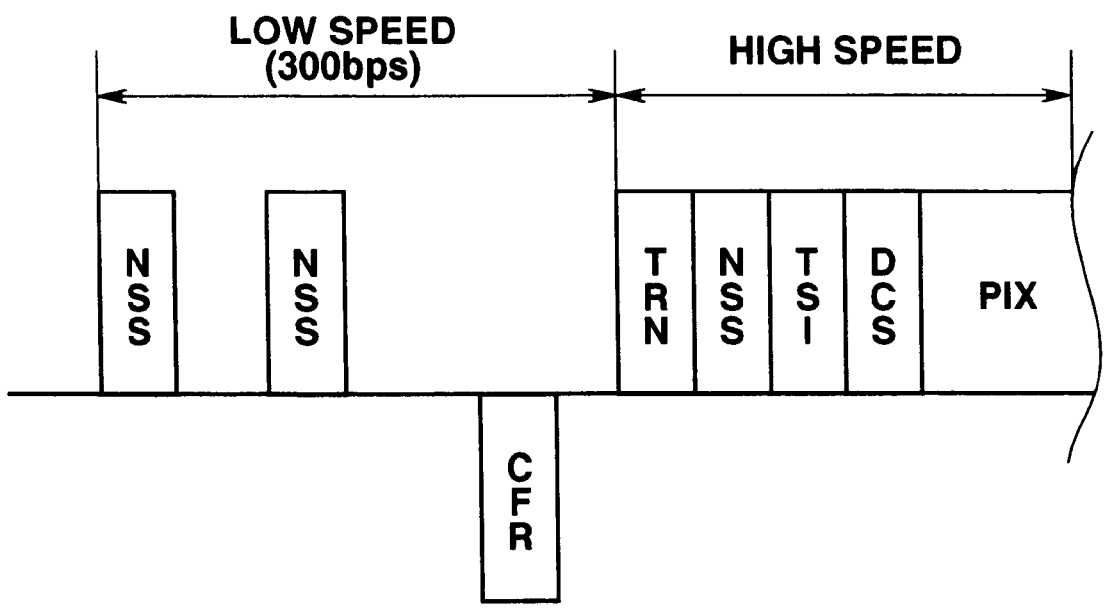
FIG. 3 is a diagram illustrating a communication method of communication procedures according to a first embodiment of the present invention.

While transmitting the NSS in step S5, a response signal is detected in step S6. When a CFR has been received in step S6, then in step S8, a training signal and transmission information (setting of a nonstandard function, identification of a transmission terminal, a reception-instructing command and image data) are transmitted at the abovedescribed image transmission speed. That is, a high-speed signal shown in FIG. 3 is transmitted.

When the time set in the timer 2 has elapsed in step S13 while detecting a response signal in the loop of steps S6, S13 and S16, a time is set again in the timer 2, and an NSS is transmitted. When a time (for example, about 35 seconds) set in a T1 timer has elapsed in step S16, the process proceeds to step S15 for performing conventional T.30 communication procedures of disconnecting the network after transmitting a network-disconnecting signal.

Figure 8:
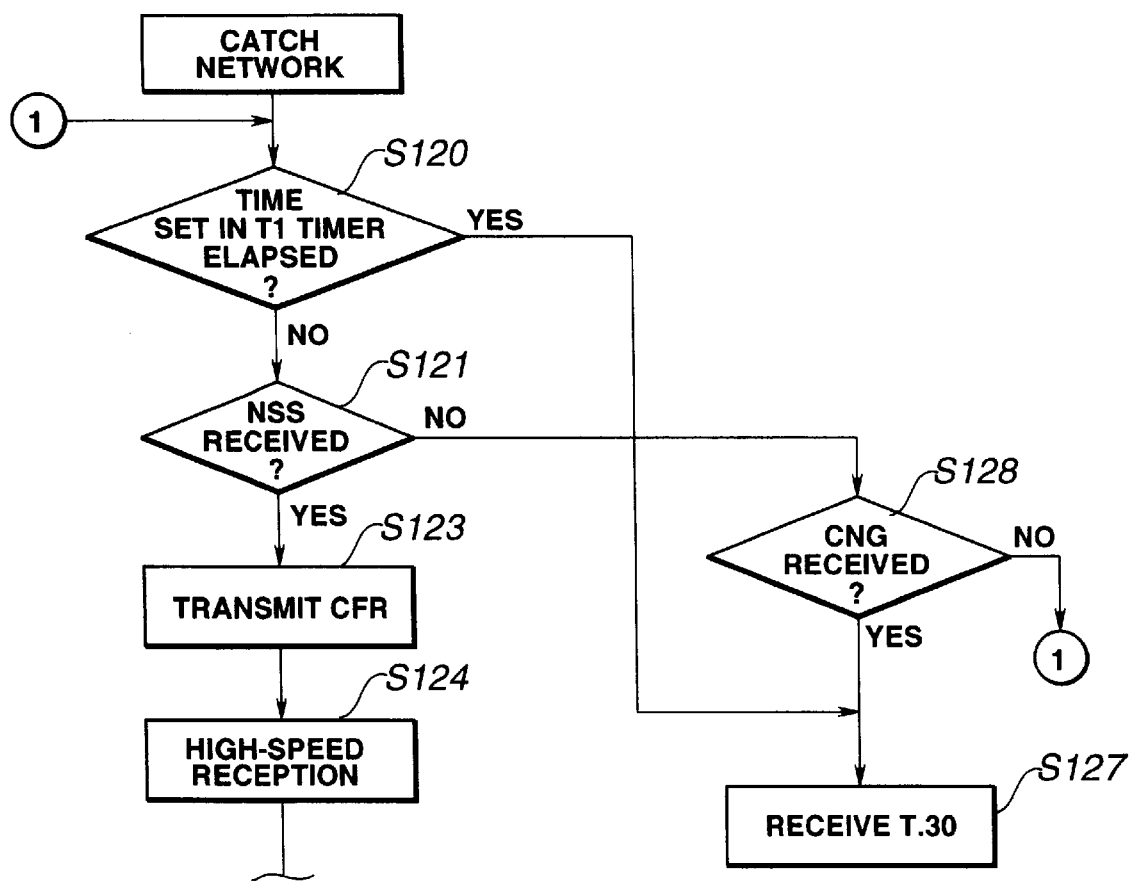
FIG. 8 is a flowchart illustrating the processing of a receiver.

Next, a description will be provided of the operation of the receiver side with reference to the flowchart shown in FIG. 8.

In FIG. 8, after detecting a ringing signal and catching the network, the loop of the detection of the reception of an NSS in step S121 and the detection of the reception of a CNG in step S128 is repeated until a time set in the T1 timer elapses. When an NSS has been received in step S121, the process proceeds to step S123, where a CFR is transmitted. In the next step S124, the process shifts a reception mode of receiving the training signal, the transmission information and the image data, at an image transmission speed assigned by the received NSS. When a CNG has been received in step S128, the process proceeds to step S127 for performing conventional T.30 reception procedures of transmitting a CED/DIS.

When the time set in the T1 timer has elapsed in step S120, the process proceeds to step S127, in which the network is disconnected according to conventional T.30 reception procedures, and the process is terminated.

In the above-described first embodiment, the transmission of an NSS and the reception of a CFR are periodically checked until the time set in the T1 timer elapses.

Next, a description will be provided of a case of shifting from the periodic transmission of an NSS to ordinary T.30 communication procedures in the midst of the time set in the T1 timer, as a second embodiment of the present invention.

Figure 5:
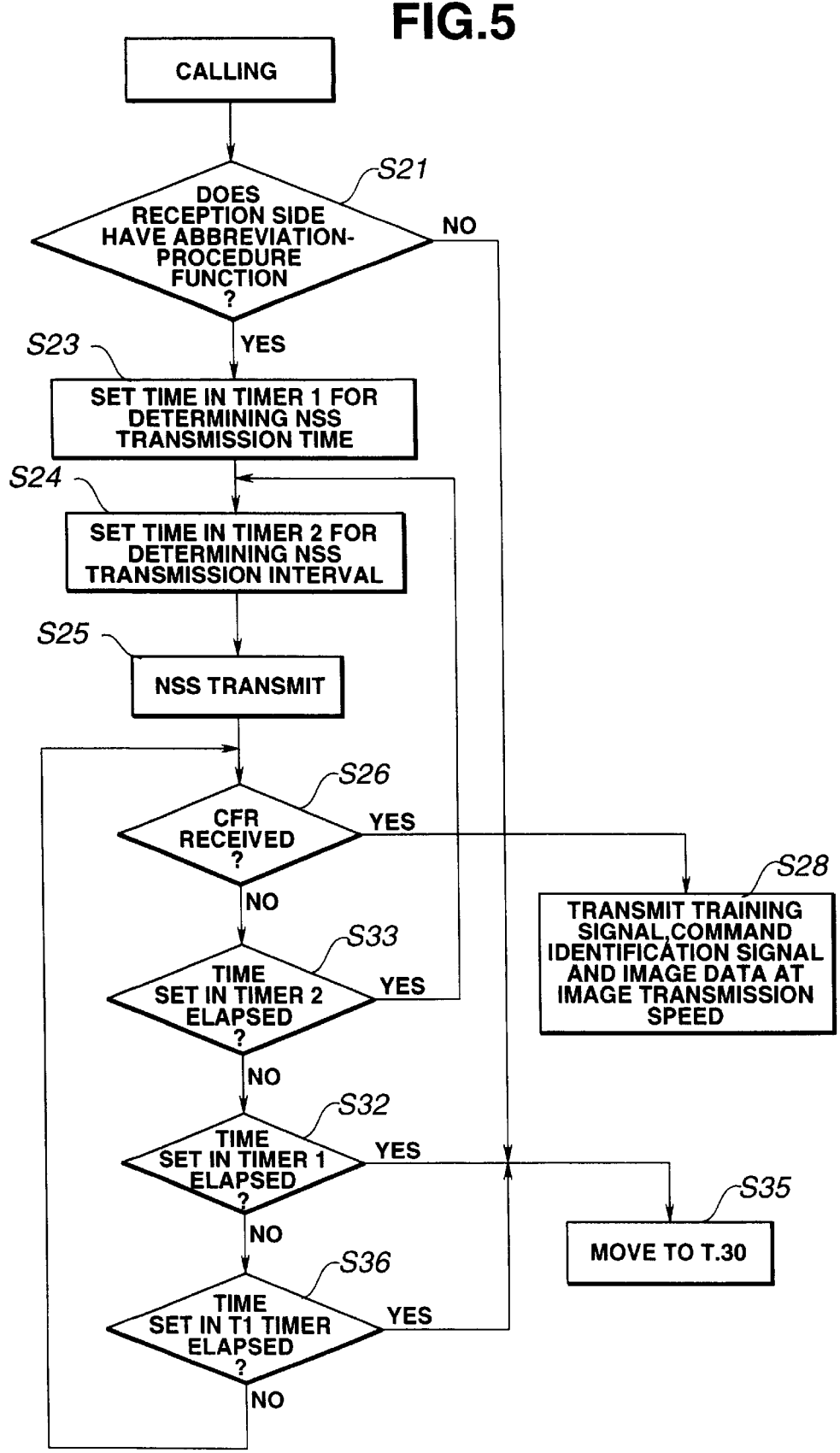
FIG. 5 is a flowchart illustrating the operation of a second embodiment of the present invention.

FIG. 5 is a flowchart illustrating the control operation of the CPU 3 in the second embodiment.

In FIG. 5, in a transmission operation using a one-touch/abbreviated dial, after the calling operation, if the abbreviation-procedure information 33 of the calling-information data 30 of the one-touch/abbreviated dial is OFF (i.e., the communication partner's apparatus does not have an abbreviation-procedure function) in step S21, the process is branched to step S35 for conventional T.30 communication procedures for transmitting a CNG. If the abbreviation-procedure information 33 is ON (i.e., the communication partner's apparatus has the abbreviation-procedure function) in step S21, the succeeding steps are executed. The transmission side sets a time in a timer 1 for determining the transmission time of an NSS in step S23, and sets a time in a timer 2 for determining the interval of NSS transmission in step S24, refers to the abbreviation-procedure information 22 which has been stored in the RAM 20 for each one-touch/abbreviated dial, inputs the highest image transmission speed which can be received by the receiver to the NSS, and transmits the NSS in step S25.

While transmitting the NSS in step S25, a response signal is detected in step S26. When a CFR has been received in step S26, then in step S28, a training signal and transmission information (setting of a nonstandard function, identification of a transmission terminal, a reception-instructing command and image data) are transmitted at the above-described image transmission speed in step S28.

When the time set in the timer 2 has elapsed in step S33 while detecting a response signal in the loop of steps S26, S33, S32 and S36, a time is set again in the timer 2 in step S24, and an NSS is transmitted in step S25. When a time set in the T1 timer has elapsed in step S32, the process proceeds to step S35 for performing the T.30 transmission procedures of transmitting a CNG at a constant interval. When the time set in the T1 timer has elapsed in step S16 of FIG. 4, the process proceeds to step S15 for performing conventional T.30 reception procedures of disconnecting the network after transmitting a network-disconnecting signal.

The processing at the receiver side is the same as the flow shown in FIG. 8.

In the above-described second embodiment, switching from the transmission of an NSS to the ordinary T.30 communication procedures is performed by the timer T1.

Figure 6:
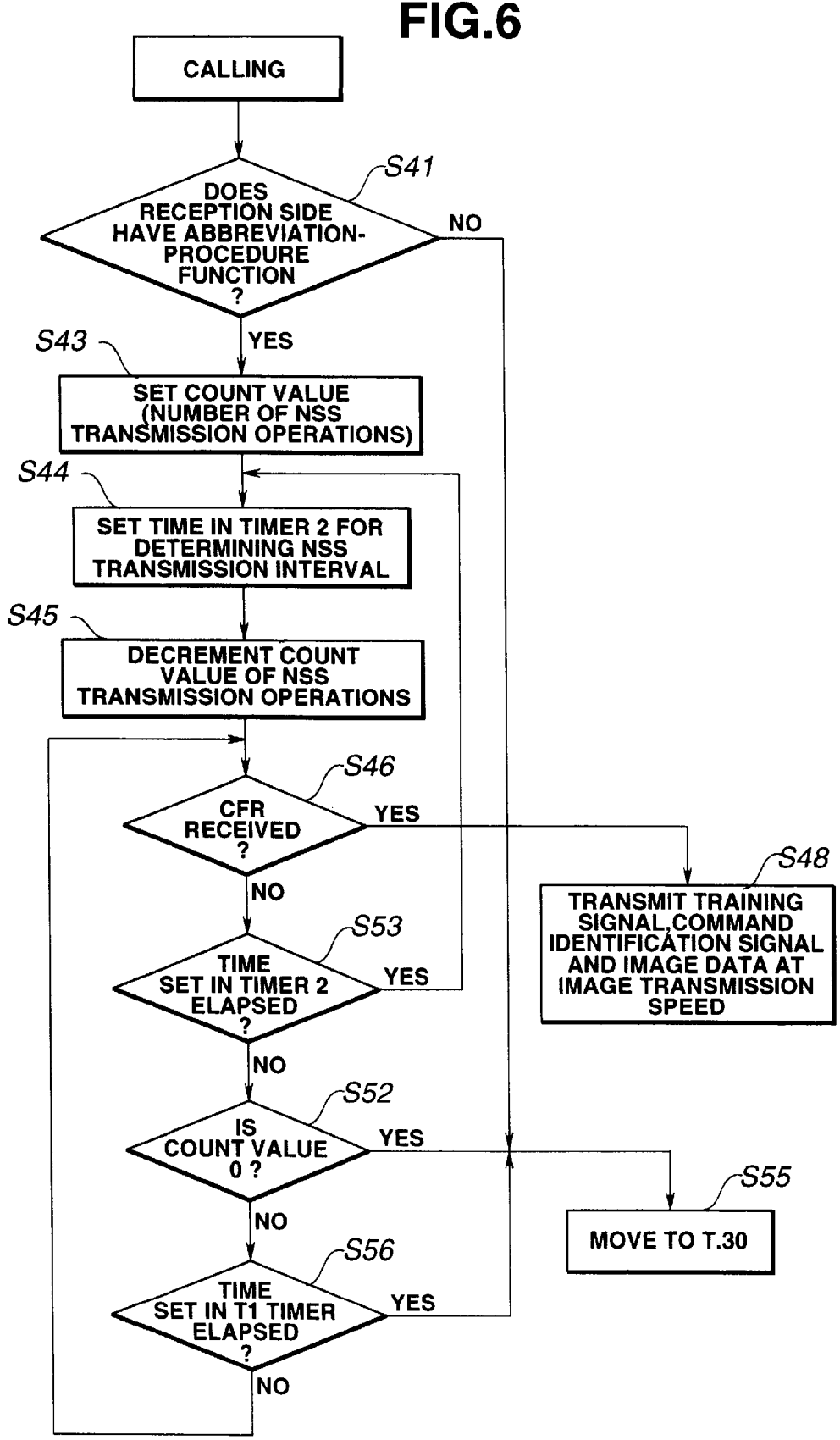
FIG. 6 is a flowchart illustrating the operation of a third embodiment of the present invention.

Next, a description will be provided of a case of shifting to the T.30 communication procedures if a CFR is not received even after transmitting an NSS a predetermined number of times, as a third embodiment of the present invention. FIG. 6 is a flowchart illustrating the operation of the third embodiment.

In FIG. 6, in a transmission operation using a one-touch/abbreviated dial, after the calling operation, if the abbreviation-procedure information 33 of the calling-information data 30 of the one-touch/abbreviated dial is OFF (i.e., the communication partner's apparatus does not have an abbreviation-procedure function) in step S41, the process is branched to the conventional T.30 communication procedures for transmitting a CNG in step S55. If the abbreviation-procedure information 33 is ON (i.e., the communication partner's apparatus has an abbreviation-procedure function) in step S41, the succeeding steps are executed. The transmission side sets a count value for determining the number of transmission operations of an NSS in step S43, and sets a time in a timer 2 for determining the interval of NSS transmission in step S44, refers to the abbreviation-procedure information 22 which has been stored in the RAM 20 for each one-touch/abbreviated dial, inputs the highest image transmission speed which can be received by the receiver to the NSS, and transmits the NSS in step S45.

In step S45, the NSS is transmitted and the count value is decremented.

While transmitting the NSS in step S45, a response signal is detected in step S46. When a CFR has been received in step S46, then in step S48, a training signal and transmission information (setting of a nonstandard function, identification of a transmission terminal, a reception-instructing command and image data) are transmitted at the above-described image transmission speed in step S48.

When the time set in the timer 2 has elapsed in step S53 while detecting a response signal in the loop of steps S46, S53, S52 and S56, a time is set again in the timer 2 in step S44, and an NSS is transmitted. When the count value has become 0 in step S52, the process proceeds to step S55 for performing the T.30 transmission procedures of transmitting a CNG at a constant interval.

When the time set in the T1 timer has elapsed in step S56 (step S16 of FIG. 4), the process proceeds to step S55 (step S15 of FIG. 4) for performing conventional T.30 reception procedures of disconnecting the network after transmitting a network-disconnecting signal.

The processing at the receiver side is the same as the flow shown in FIG. 8.

Figure 7:
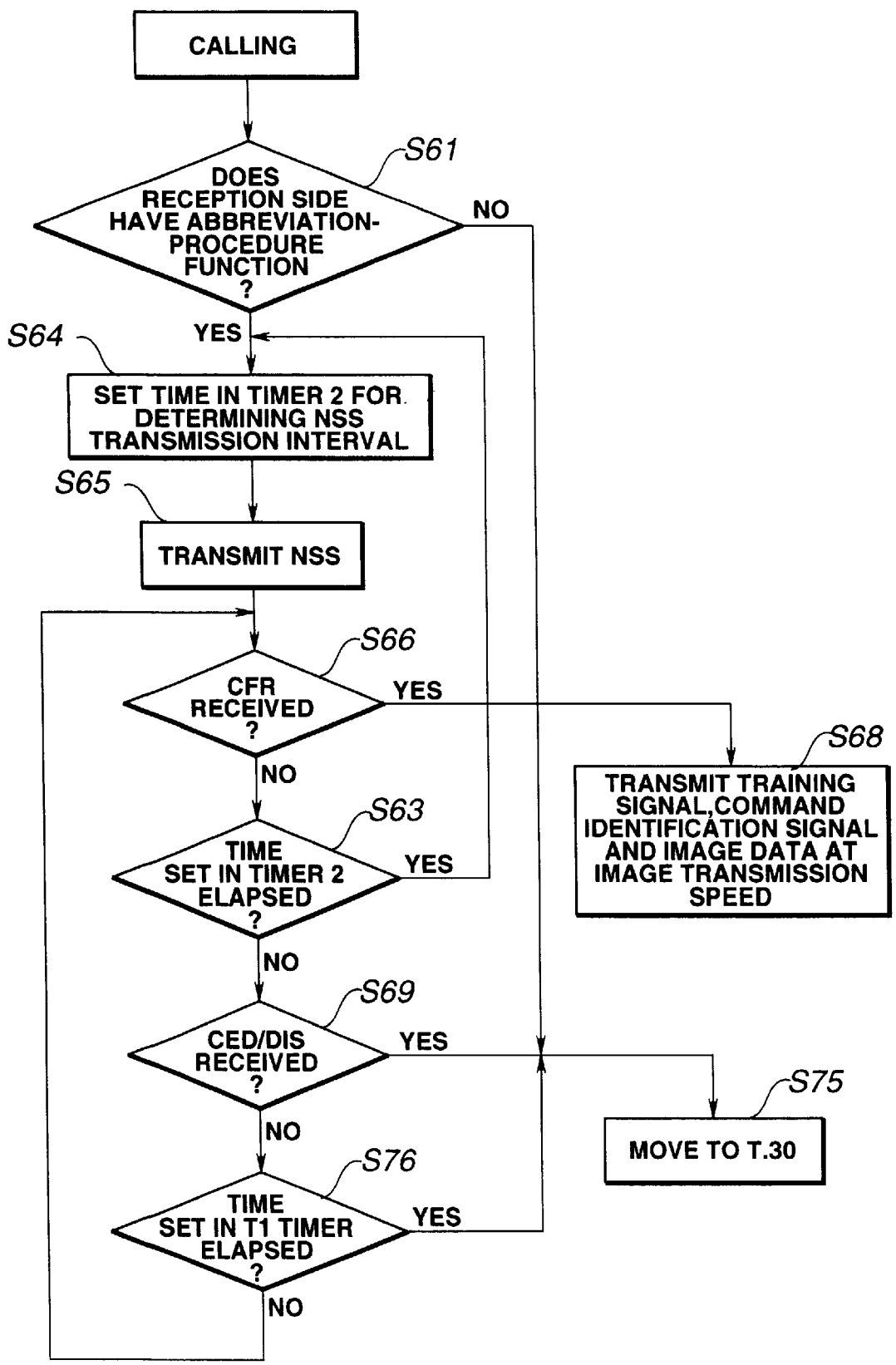
FIG. 7 is a flowchart illustrating the operation of a fourth embodiment of the present invention.

Next, a description will be provided of a case of checking the reception of a CFR and the reception of a CED/DIS while transmitting an NSS, as a fourth embodiment of the present invention. FIG. 7 is a flowchart illustrating the operation of the fourth embodiment.

In FIG. 7, in a transmission operation using a one-touch/abbreviated dial, after the calling operation, if the abbreviation-procedure information 33 of the calling-information data 30 of the one-touch/abbreviated dial is OFF (i.e., the communication partner's apparatus does not have an abbreviation-procedure function) in step S61, the process is branched to the conventional T.30 communication procedures for transmitting CNG in step S75. If the abbreviation-procedure information 33 is ON (i.e., the communication partner's apparatus has an abbreviation-procedure function) in step S61, the succeeding steps are executed. The transmission side sets a time in a timer 2 for determining the interval of NSS transmission in step S64, refers to the abbreviation-procedure information 22 which has been stored in the RAM 20 for each one-touch/abbreviated dial, inputs the highest image transmission speed which can be received by the receiver to the NSS, and transmits the NSS in step S65.

While transmitting the NSS in step S65, a response signal is detected in step S66. When a CFR has been received in step S66, then in step S68, a training signal and transmission information (setting of a nonstandard function, identification of a transmission terminal, a reception-instructing command and image data) are transmitted at the above-described image transmission speed in step S68.

When a CED/DIS has been received in step S69, the process proceeds to step S75 for performing the T.30 transmission procedures of transmitting a CNG with a predetermined time interval.

When the time set in the timer 2 has elapsed in step S63 while detecting a response signal in the loop of steps S66, S63, S69 and S76, a time is set again in the timer 2, and an NSS is transmitted in step S65. When a time set in the T1 timer has elapsed in step S76, the process proceeds to step S75 for performing the conventional T.30 reception procedures of disconnecting the network after transmitting a network-disconnecting signal.

The processing at the receiver side is the same as the flow shown in FIG. 8.

In the above-described processing at the receiver shown in FIG. 8, the reception of an NSS and the reception of a CNG are checked until the time set in the T1 timer elapses. However, the process may shift from the check of the reception of an NSS and a CNG to the ordinary T.30 communication procedures in the midst of the time set in the T1 timer. A description will now be provided of such a case as a fifth embodiment of the present invention.

Figure 9:
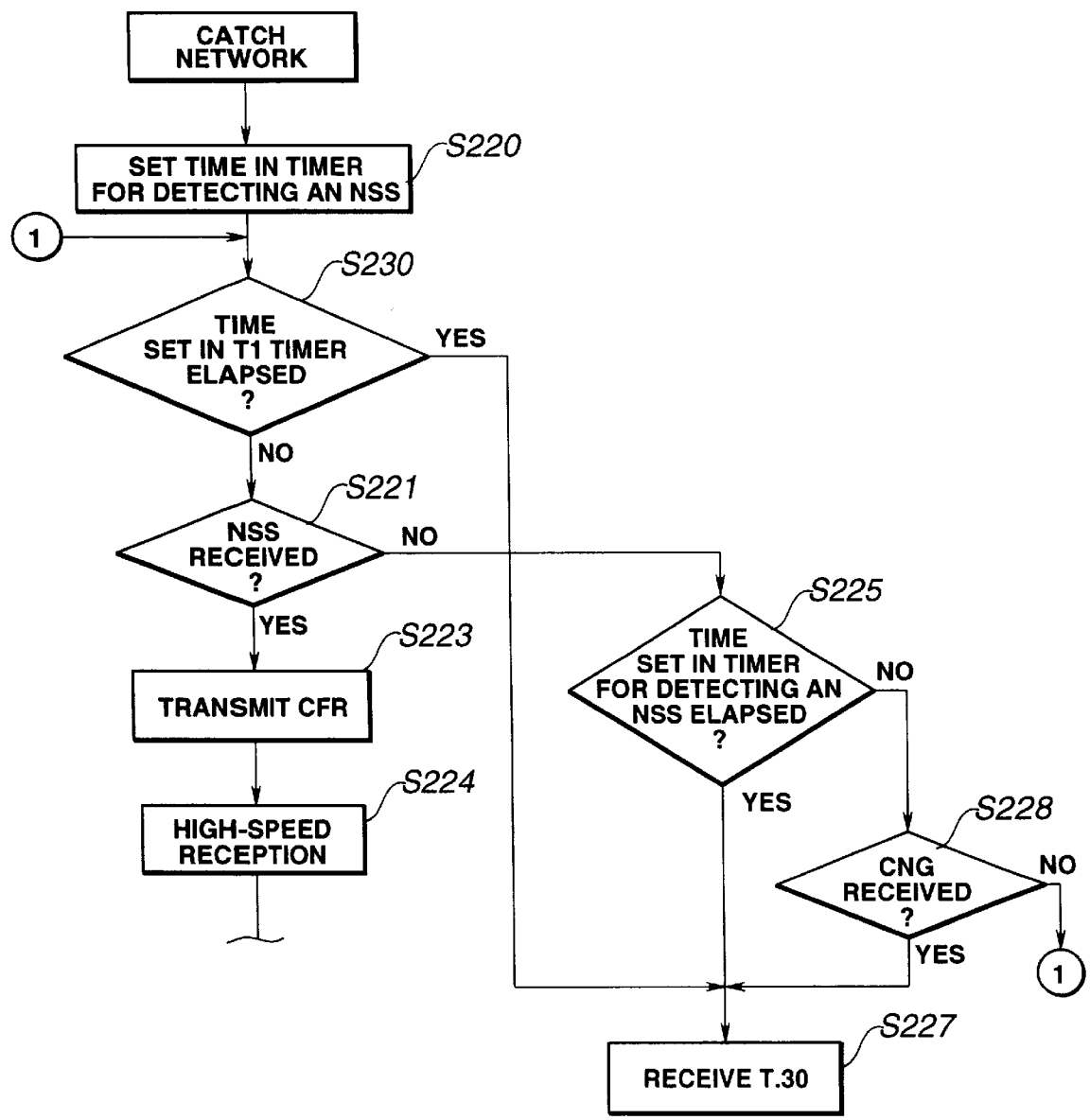
FIG. 9 is a flowchart illustrating the operation of a fifth embodiment of the present invention.

FIG. 9 is a flowchart illustrating the processing at the receiver in the fifth embodiment.

In FIG. 9, a timer for detecting an NSS is set in step S220. The detection of an NSS in step S221 and the detection of a CNG in step S228 are repeated until the time set in the timer T1 elapses. When an NSS has been received in step S221, a CFR is transmitted in step S223, and the process proceeds to step S224, where the process shifts to a mode of receiving a training signal, transmission information and image data at an image transmission speed assigned by the received NSS.

When the time set in the timer for detecting an NSS has elapsed in step S225, or when a CNG has been received in step S228, the process proceeds to step S227 for executing the conventional T.30 reception procedures of transmitting a CED/DIS.

When the time set in the timer has elapsed in step S230, the process proceeds to step S227, where the network is disconnected according to the conventional T.30 reception procedures, and the process is terminated.

In the above-described second through fourth embodiments, when shifting to the conventional CCITT recommendation T.30 reception procedures (step S15 shown in FIG. 4, step S35 shown in FIG. 5, step S55 shown in FIG. 6, and step S75 shown in FIG. 7), or when an erroneous communication operation has been performed, the abbreviation-procedure information 33 of the one-touch/abbreviated-dial data 30 stored in the RAM 5 is set to OFF.

In the above-described embodiments, a description has been provided of the processing when the transmission side performs a transmission operation.

A description will now be provided of a case in which the time required for communication procedures during polling communication is shortened, as a sixth embodiment of the present invention.

Figure 14:
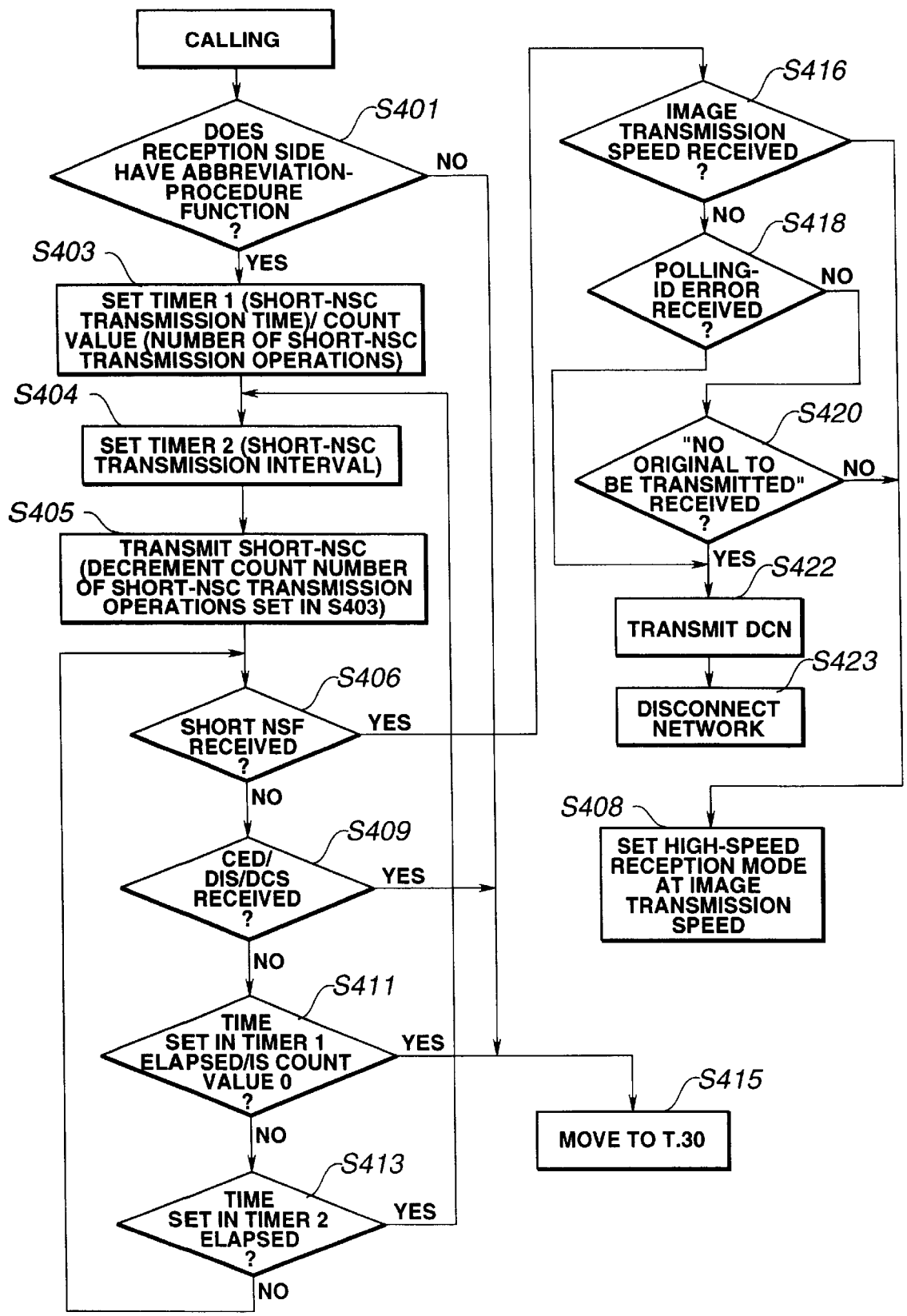
FIG. 14 is a flowchart illustrating the operation of a calling side according to the sixth embodiment.

FIG. 14 is a flowchart illustrating the control operation of the CPU 3 in a calling operation in the sixth embodiment.

In polling reception of an automatic call using a one-touch/abbreviated dial, when the abbreviation-procedure information 33 of the one-touch/abbreviated-dial data 30 is OFF (the communication partner's apparatus does not have an abbreviation-procedure function) in step S401, the process proceeds to step S415 for executing conventional T.30 communication procedures of transmitting a CNG.

When the abbreviation-procedure information 33 is ON (the communication partner's apparatus has an abbreviation-procedure function) in step S401, the process proceeds to step S403, where a time is set in a timer 1 for determining the transmission time of an NSC, and a count value for determining the number of transmission operations of an NSC is also set.

In step S404, the transmission side sets a time in a timer 2 for determining the transmission interval of an NSC.

In step S405, by referring to the abbreviation-procedure information 22 stored in the RAM 20 for each one-touch/abbreviated dial, the polling ID and a few lower digits of the registered telephone number of the transmitter's apparatus are input to the NSC, and the NSC is transmitted. The count value is decremented after transmitting the NSC.

Figure 13:
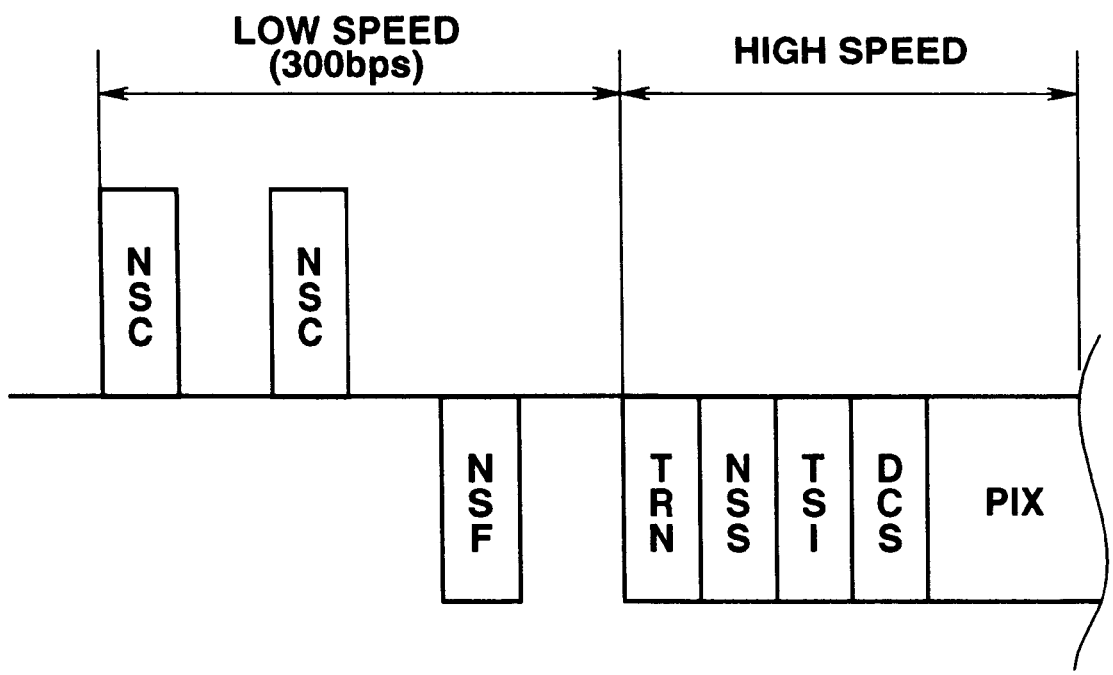
FIG. 13 is a diagram illustrating a communication method of communication procedures in a sixth embodiment of the present invention.

In step S406, a response signal is detected while transmitting the NSC in step S405. When an NSF has been received in step S406, and if the contents of the NSF relate to the image transmission speed in step S416, the process proceeds to step S408, where the process shifts to a high-speed reception mode at the above-described image transmission speed, and a high-speed signal shown in FIG. 13 is received.

When the contents of the NSF received in step S406 have been determined to be a polling-ID error in step S418, or when no original to be transmitted is present at the transmission side, the process proceeds to step S422, where a network-disconnecting command is transmitted, and the network is disconnected in step S423.

When the time set in the timer 1 has elapsed or the count value is determined to be 0 in step S411, the process proceeds to step S415 for executing the conventional T.30 communication procedures.

When the time set in the timer 2 has elapsed in step S413, a time is set again in the timer 2 in step S404, and the process proceeds to step S405, where an NSC is transmitted and the count value is decremented after transmitting the NSC.

When a CED/DIS/DCS has been received in step S409, the process proceeds to step S415 for executing the conventional T.30 communication procedures.

When a DCS has been received in step S409, the process porceeds to step S415 for executing conventional T.30 communication procedures.

Figure 15:
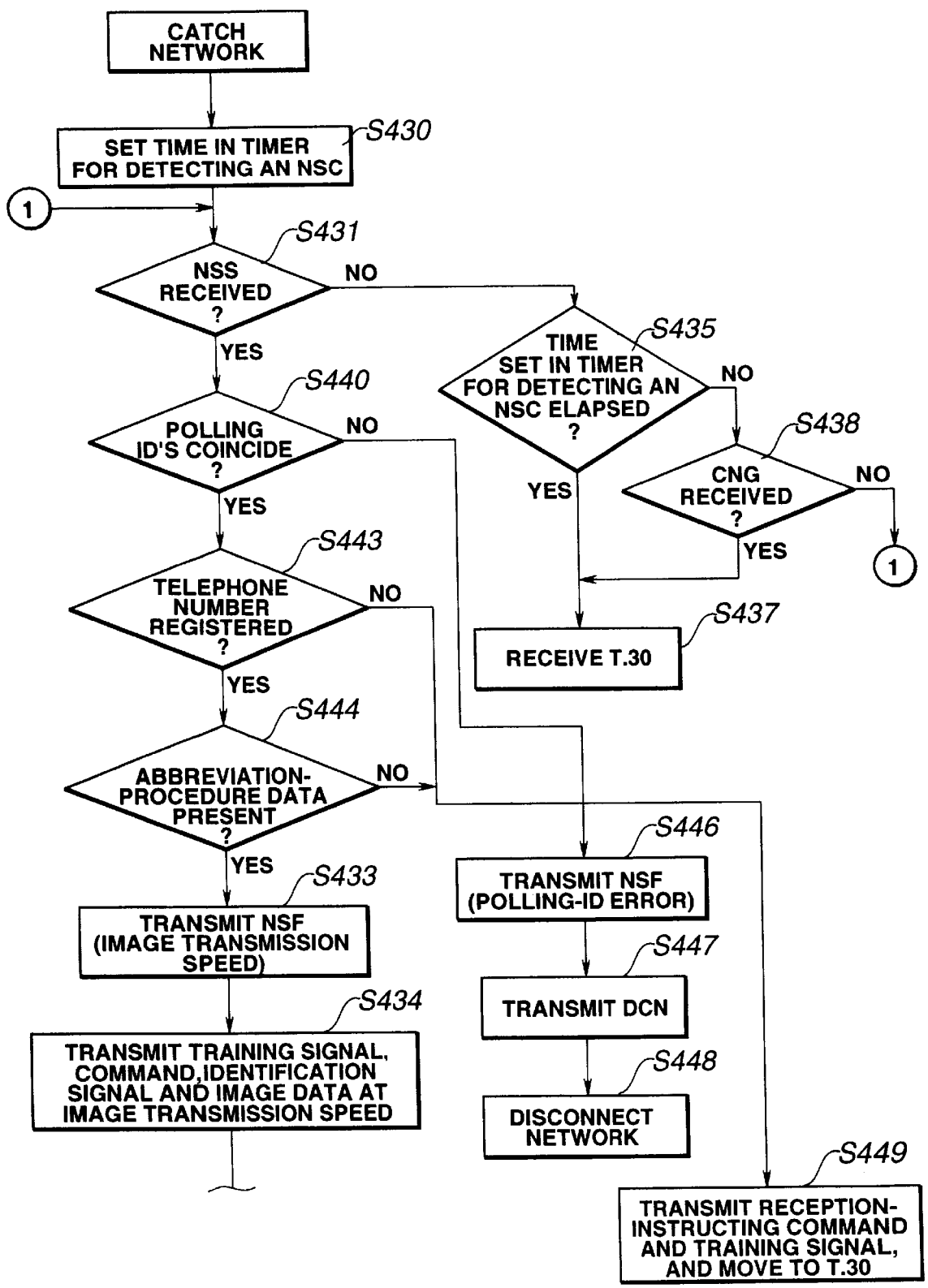
FIG. 15 is a flowchart illustrating the operation of a called side according to the sixth embodiment.

FIG. 15 illustrates the processing at the called side. After catching the network, a time is set in a timer for detecting an NSC in step S430. When an NSC has been detected in step S431, the process proceeds to step S440, where it is determined if the polling ID of the received NSC coincides with that of the called side. If the result of the determination is affirmative, the process proceeds to step S443, where it is determined if a telephone number, a few lower digits of which coincide with those of the received telephone number, is registered in the one-touch/abbreviated dial. If the result of the determination is affirmative, the process proceeds to step S444. When the abbreviation-procedure information 33 of the calling information 30 of that telephone number is ON (an abbreviation-procedure function is present) in step S444, then in step S433, the image transmission speed is transmitted with an NSF while referring to the abbreviation-procedure information 22 of the corresponding one-touch/abbreviated dial 21. In step S434, a training signal, an identification signal, a reception-instructing command and image data are transmitted at the above-described image transmission speed.

If the result of the determination in step S440 is negative, the process proceeds to step S446, where a polling ID error is transmitted with an NSF. In step S447, a network-disconnecting command is transmitted. In step S448, the network is disconnected.

If the result of the determination in step S440 is affirmative but the result of the determination in step S443 is negative, or if the result of the determination in step S443 is affirmative but an abbreviation-procedure function is absent in step S444, then in step S449, a reception-instructing command DCS is transmitted, and the process proceeds to communication procedures conforming to the CCITT recommendation T.30.

The detection operations in steps S431 and S438 are repeated until the time set in the timer for detecting an NSC elapses in step S435. When a CNG has been received in step S438, the process proceeds to step S437 for the conventional T.30 reception procedures of transmitting a CED/DIS. When the time set in the timer has elapsed in step S435, the process proceeds to step S437 for the conventional T.30 reception procedures of transmitting a CED/DIS.

When the process has proceeded to the above-described communication procedures conforming to the CCITT recommendation T.30, or when erroneous communication has been performed, the calling side makes the abbreviation-procedure information 33 of the one-touch/abbreviated-dial data 30 stored in the RAM 5 OFF.

In the above-described embodiments, the abbreviation-procedure information 22 of the one-touch/abbreviated-dial data stored in the RAM 5 is checked for every communication operation with the communication partner to determine if the communication partner's apparatus has changed. If the result of the check is affirmative, the abbreviation-procedure information is rewritten (updated) in accordance with a procedure signal received from the communication partner. A description will now be provided of such updating processing.

Figure 16:
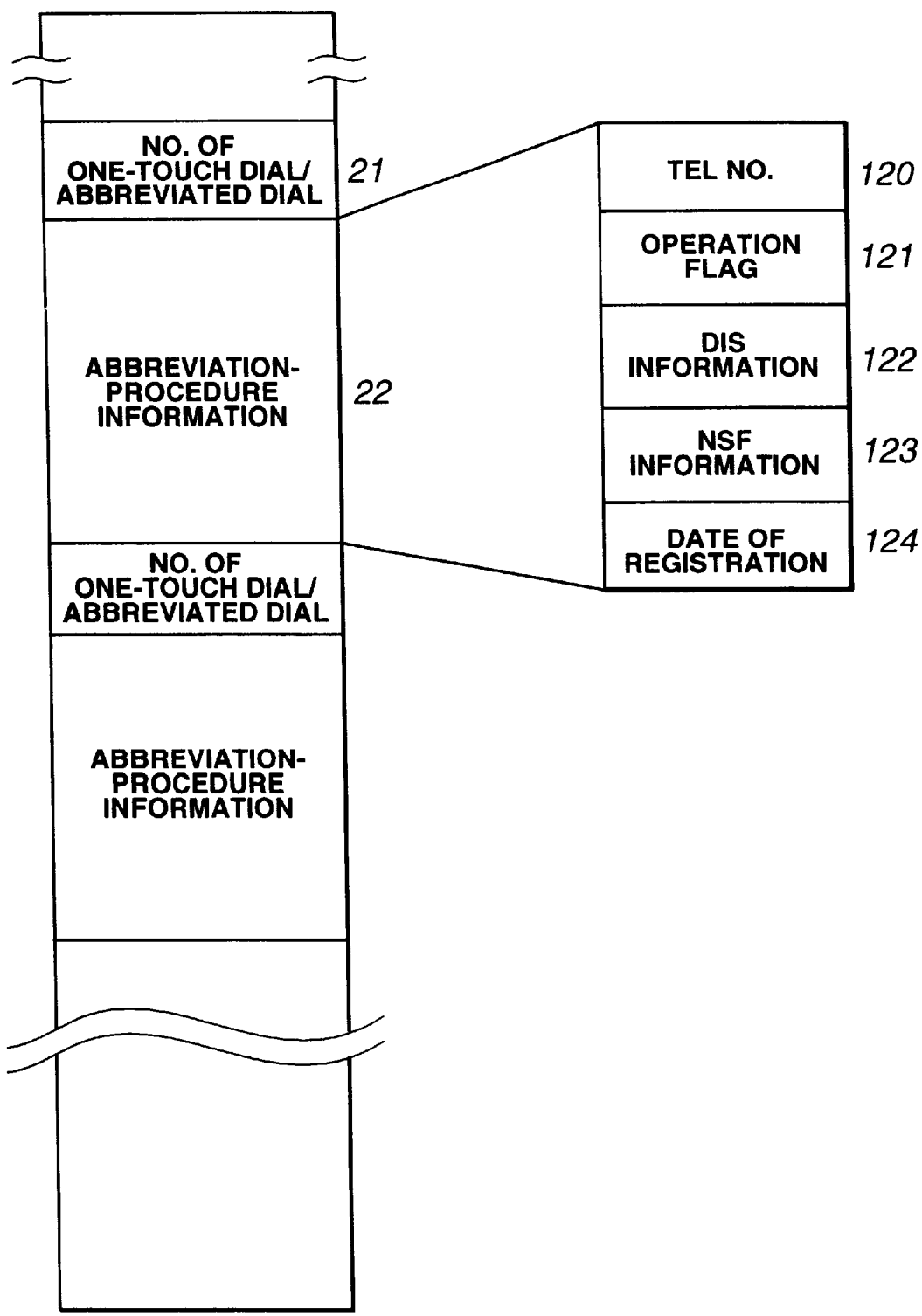
FIG. 16 is a diagram illustrating information relating to abbreviation procedures.

FIG. 16 is a diagram illustrating the contents of abbreviation-procedure information. The abbreviation-procedure information comprises telephone-number information 120, an abbreviation-procedure operation flag 121 indicating if information relating to abbreviation procedure is stored, DIS information 122 of a communication partner's apparatus, NSF information 123 of the communication partner's apparatus, and a date of registration 124 of information relating to the function of the communication partner's apparatus.

Figure 17:
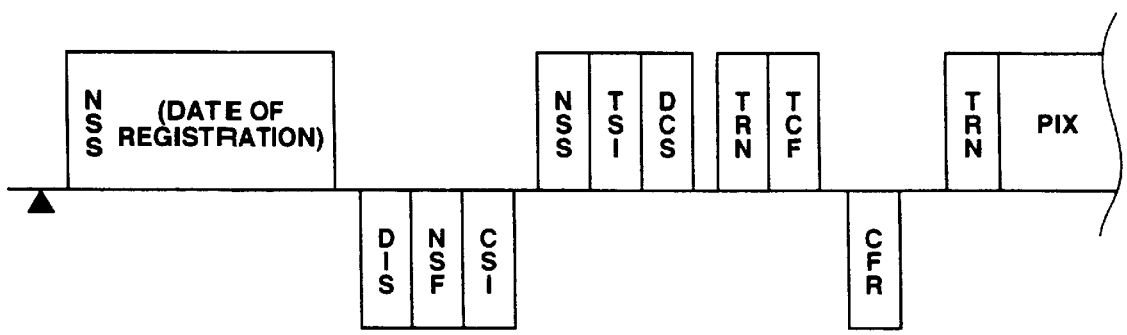
FIG. 17 is a diagram illustrating the sequence when executing the T.30 procedures because of incoincidence between registration dates.
Figure 18:
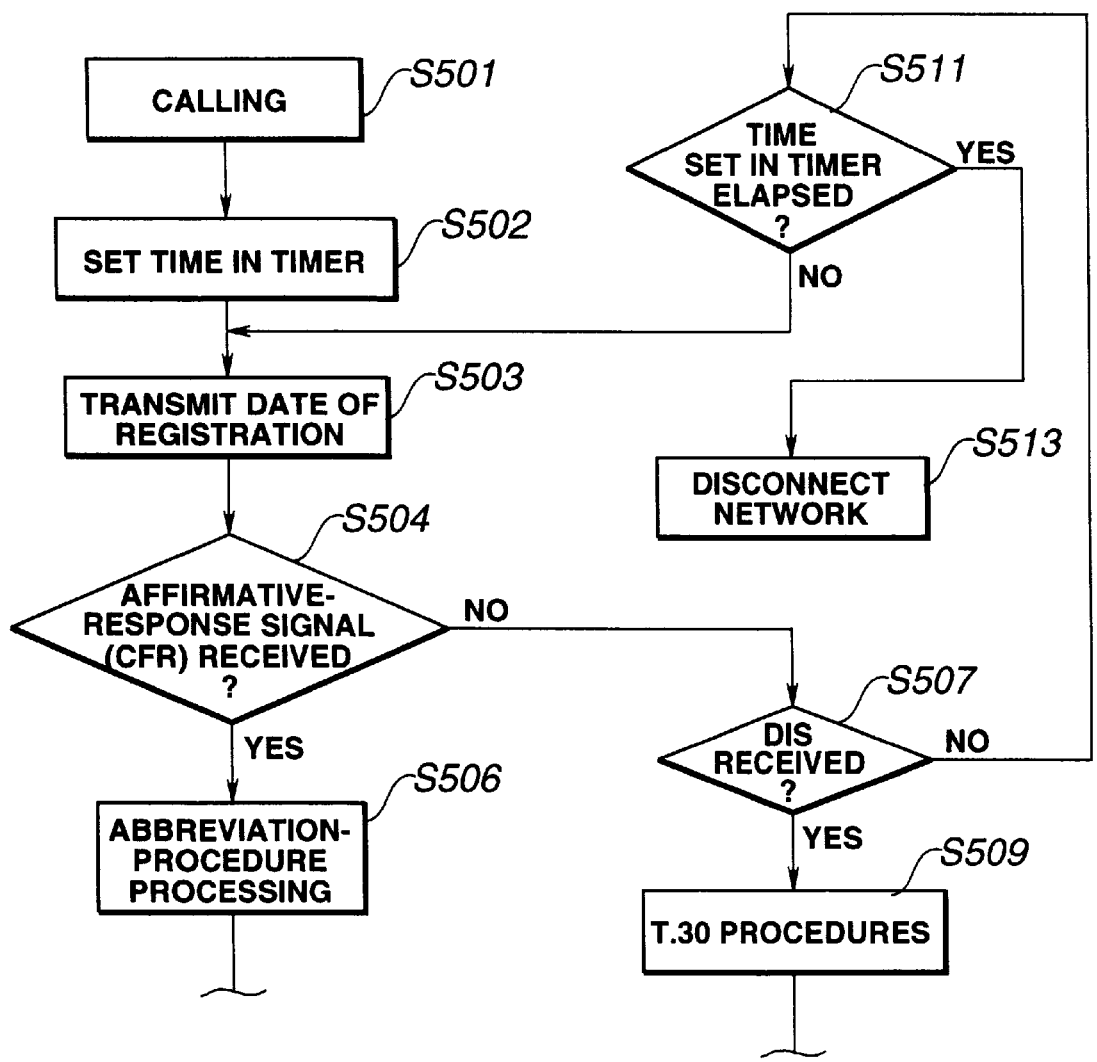
FIG. 18 is a flowchart illustrating the processing at the calling side when the registration date is checked at the called side.
Figure 19:
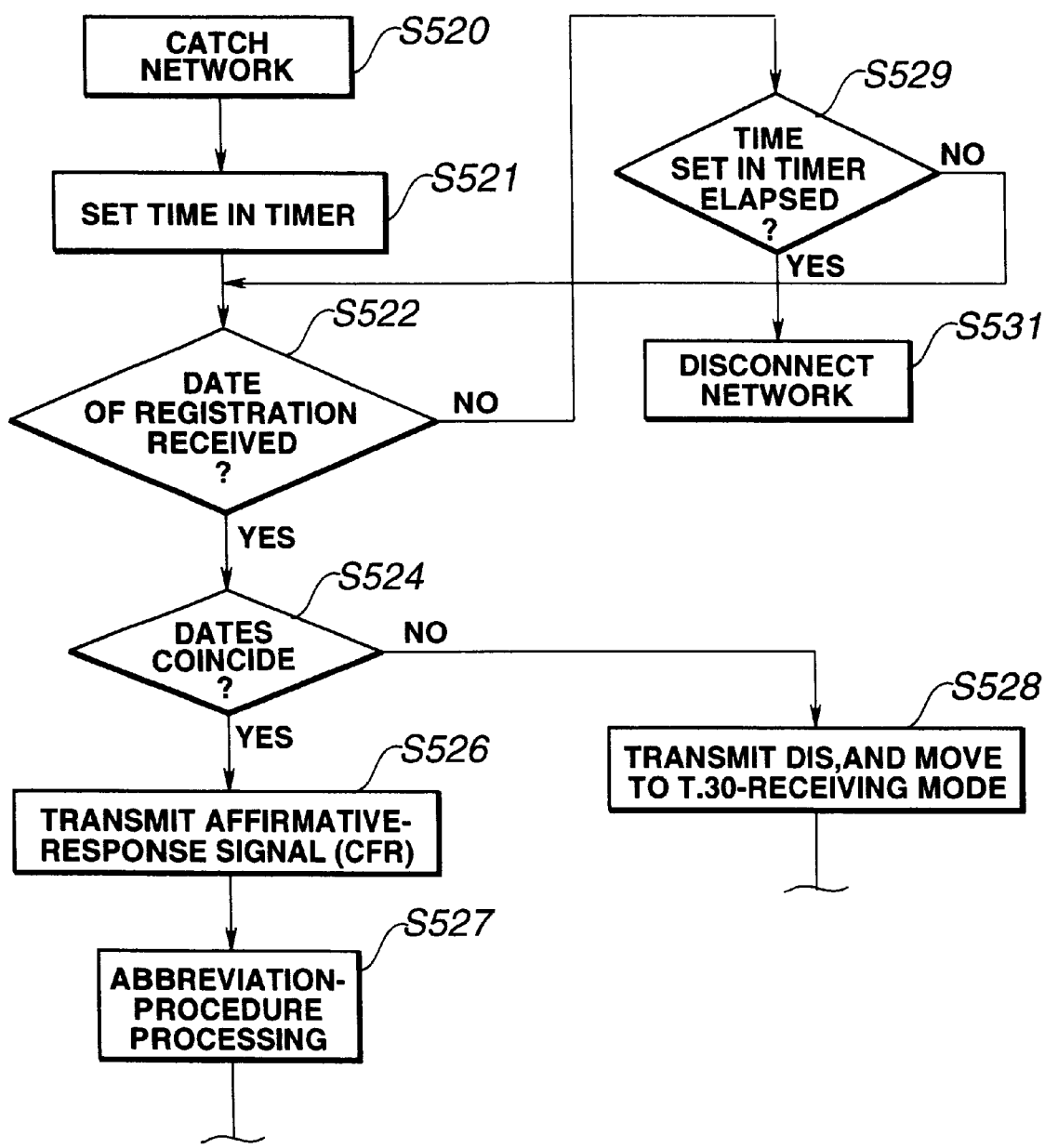
FIG. 19 is a flowchart illustrating the processing at the called side when the registration date is checked at the called side.

Next, a description will be provided of updating processing with reference to FIGS. 17 through 19.

First, a description will be provided of the operation of the transmission side with reference to FIG. 18. In transmission in which the transmitter side performs a calling operation using a one-touch dial or an abbreviated dial, if the abbreviation-procedure operation flag 121 of the abbreviation-procedure information 22 of the one-touch/abbreviated dial stored in the RAM 5 shown in FIG. 16 is ON as a result of referring to the abbreviation-procedure operation flag 121, the fact indicates that information relating to the receiver is stored. Hence, in FIG. 18, after a calling operation of the transmitter side (step S501), a time is set in a communication timer (step S502), the date of registration 124 shown in FIG. 16 is transmitted using a nonstandard-function setting signal (hereinafter termed an "NSS") (step S503), and the process proceeds to a state of awaiting the reception of a response signal (the loop of steps S503, S504, S507 and S511). When an affirmative-response signal (CFR) has been received in step S504, the above-described processing of abbreviation procedures (the sequence shown in FIG. 3) is executed in accordance with the registered abbreviation-procedure information (step S506).

When a DIS has been received from the receiver in the above-described step S507 of awaiting the reception of a response signal shown in FIG. 18, the transmitter transmits a reception command in response to the received DIS, and transmits an image signal upon reception of a reception-preparation-confirming signal after transmitting a training signal and the like according to the conventional T.30 procedures (step S509). Procedures after this operation conform to the conventional T.30 procedures or the like. FIG. 17 illustrates a timing chart for the above-described processing.

When the time set in the timer has elapsed without receiving a signal from the receiver in the above-described step S511 of awaiting the reception of a response signal, the network is disconnected (step S513), and the transmission processing is terminated.

Next, a description will be provided of the operation at the reception side with reference to FIG. 19. After catching the network (step S520), a time is set in a reception timer (step S521), and the process proceeds to a state of awaiting a command for a predetermined time period (the loop of steps S522 and S529). When the date of registration/updating of the receiver's apparatus has been received with an NSS in step S522, then in step S524, the received date is compared with the date registered in the receiver's apparatus. If the dates coincide, an affirmative-response signal (CFR) is transmitted (step S526) and the process proceeds to step S527, where the above-described abbreviation-procedure processing, shown in the sequence of FIG. 3, is executed. If the dates do not coincide, the process shifts to the ordinary T.30 reception mode (step S528).

When a signal has not been received from the transmitter and the time set in the timer has elapsed in the above-described step S529 of awaiting a command, the network is disconnected (step S531), and the transmission processing is terminated.

In the T.30 procedures in steps S509 (of FIG. 18) and S528 (of FIG. 9), new registration-date information is exchanged through the transmission/reception of an NSS and an NSF, and the DIS information 122, the NSF information 123 and the registration date 124, of the abbreviation-procedure information stored in the RAM 5 of the calling side, are rewritten (updated). At that time, a flag indicating the possibility of execution of abbreviation procedures included in the NSF information is checked. If the flag is ON, the operation flag 121, shown in FIG. 16, is set to OFF. It is thereby possible to perform appropriate communication processing in the subsequent communication.

In the above-described processing shown in FIGS. 17–19, the called side checks the date of registration. However, the date of registration may also be checked at the calling side.

Figure 20:
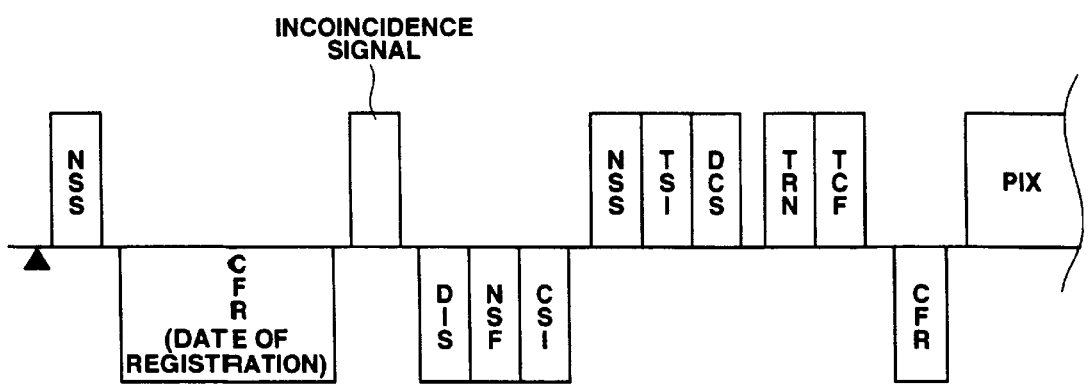
FIG. 20 is a diagram illustrating the sequence when executing the T.30 procedures because of incoincidence between registration dates.
Figure 21:
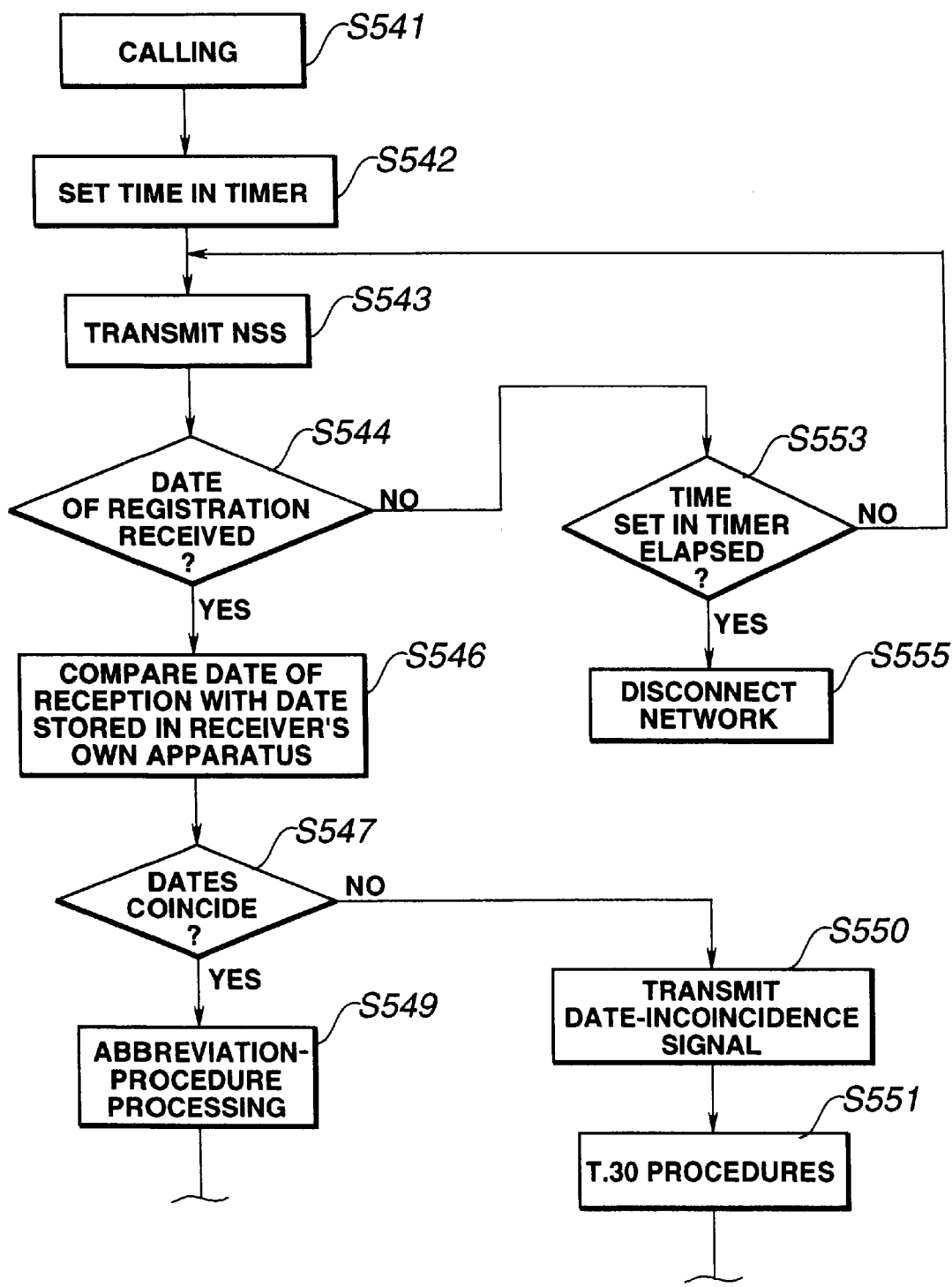
FIG. 21 is a flowchart illustrating the processing at the calling side when the calling side checks the registration date.
Figure 22:
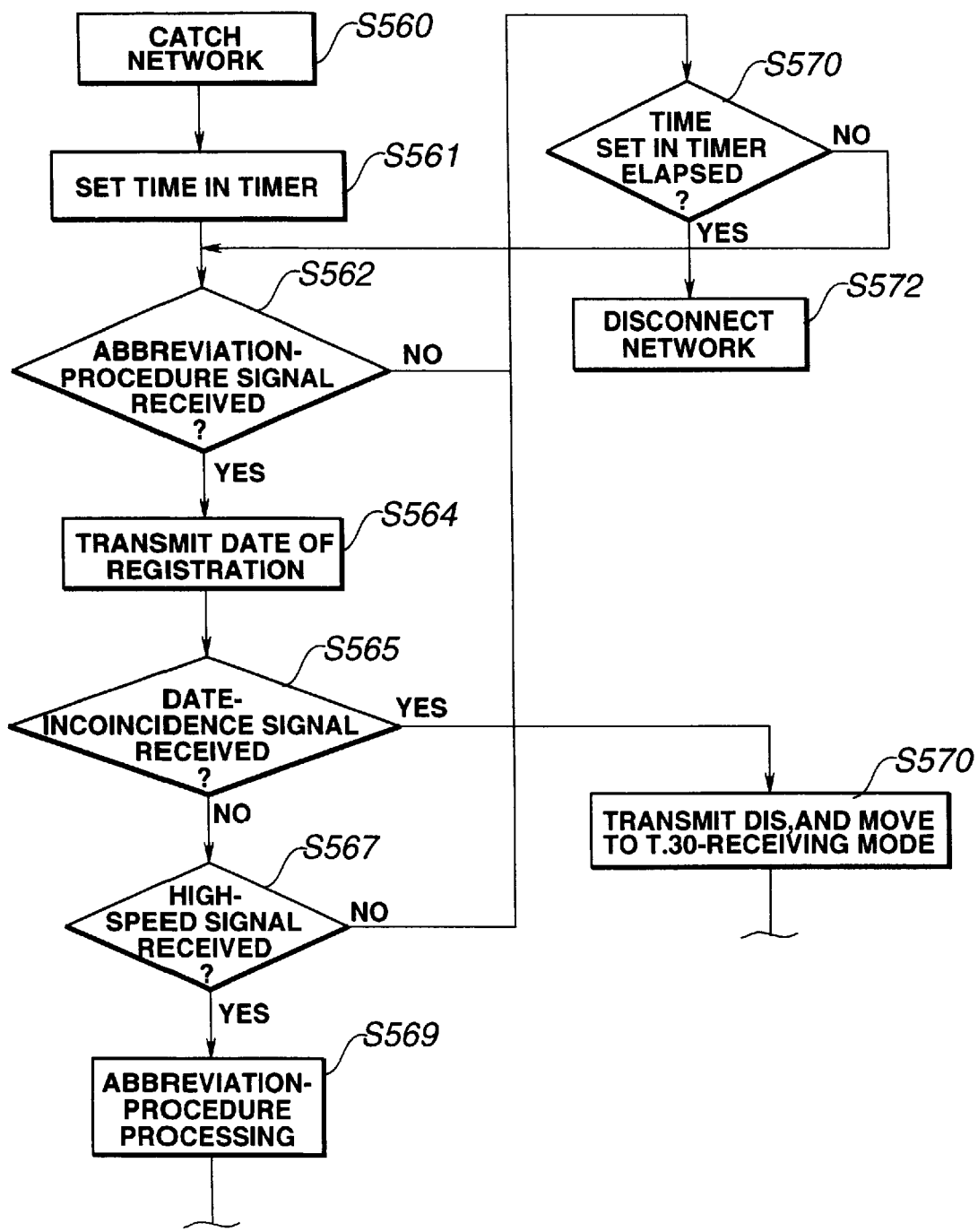
FIG. 22 is a flowchart illustrating the processing at the called side when the called side checks the registration date.

A description wil now be provided of a case in which the calling side checks the date of registration, with reference to FIGS. 20 through 22.

First, a description will be provided of the operation of the transmission side with reference to FIG. 21. In a transmission in which the transmitter side performs a calling operation using a one-touch dial or an abbreviated dial, if the abbreviation-procedure operation flag 121, of the abbreviation-procedure information 22, of the one-touch/abbreviated dial stored in the RAM 5 shown in FIG. 16, is ON, as a result of referring to the abbreviation-procedure opersation flag 121, the fact indicates that information relating to the receiver is stored. Hence, in FIG. 21, after a calling operation of the transmitter side (step S541), a time is set in a communication timer (step S542), an abbreviation-procedure signal is transmitted using an NSS (step S543), and the process proceeds to a state of awaiting the reception of a response signal (the loop of steps S543, S544 and S553). When the date of registration/updating of the receiver side has been received in step S544, the received date is compared with the date of registration/updating of the receiver side stored in the transmitter side (step S546). If the dates coincide (step S547), the above-described abbreviation-procedure processing shown in the sequence of FIG. 3 is executed (step S549).

If the dates do not coincide in step S547 shown in FIG. 21, a date-incoincidence signal is transmitted (step S550), and the process proceeds to a state of awaiting the reception of a DIS of phase B (step S551).

The subsequent processing conforms to the conventional T.30 procedures or the like. FIG. 20 illustrates a timing chart for the above-described processing.

When the time set in the timer has elapsed with receiving no signal from the receiver in the above-described step S553 of awaiting the reception of a response signal, the network is disconnected (step S555), and the transmission processing is terminated.

Next, a description will be provided of the operation at the reception side with reference to FIG. 22.

After catching the network (step S560), a time is set in a reception timer (step S561), and the process proceeds to a state of awaiting a command for a predetermined time period (the loop of steps S562 and S570). When an abbreviation-procedure signal has been received with an NSS in step S562, the date of registration/updating of the receiver's apparatus is transmitted (step S564), the process proceeds to a state of awaiting the reception of a response (the loop of steps S567 and S570). When a high-speed signal has been received from the transmitter side in this state (step S567), reception processing according to abbreviation procedures is executed (step S569).

If a date-incoincidence signal has been received in step S565 shown in FIG. 22, the process shifts to the ordinary T.30 reception mode (step S570).

When no signal has been received from the transmitter and the time set in the timer has elapsed in the above-described step S570 of awaiting a command, the network is disconnected (step S572), and the reception processing is terminated.

Also, in the processing shown in FIGS. 20 through 22, when executing the T.30 procedures due to incoincidence of the dates of registration, the abbreviation-procedure information stored in the RAM 5 is updated in the same manner as in the processing shown in FIGS. 17 through 19.

As described above, according to the present embodiments, the time required for communication procedures can be shortened. In addition, it is possible to appropriately communicate even with an apparatus which has only ordinary T.30 communication procedures.

Any of the apparatuses of the present embodiments can automatically deal with a case in which the communication partner's apparatus has changed.

The individual components designated by blocks in the drawings are all well known in the data communication apparatus arts and their specific construction and operation are not critical to the operation or the best mode for carrying out the invention.

While the present invention has been described with respect what is presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A facsimile data communication apparatus having a first mode of communicating a communication protocol signal at a low communication speed and a second mode of communicating a communication protocol signal at a high communication speed for communicating data, said apparatus comprising:

means for transmitting a signal indicating the second mode to a destination before starting reception of a called terminal identification signal at the low communication speed in response to a calling instruction;

means for receiving a confirmation signal, responsive to the indicating signal and indicating a capability of the second mode, from the destination at the low communication speed; and control means for executing the second mode in response to the confirmation signal.

2. A facsimile apparatus according to claim 1, further comprising:

storing means for storing function information of the destination, wherein said control means executes the second mode on the basis of the function information.

3. A facsimile apparatus according to claim 2, wherein said storing means stores function information of a plurality of destinations corresponding to one-touch dial keys or abbreviated dial keys.

4. A facsimile apparatus according to claim 1, further comprising:

means for receiving a communication protocol signal relating to the first mode after transmitting the indicating signal at the low communication speed, wherein said control means executes the first mode in accordance with the communication protocol of the first mode.

5. A facsimile apparatus according to claim 1, wherein the indicating signal comprises a signal indicating polling communication, and wherein the confirmation signal comprises a signal indicating the reception of the polling communication.

6. A facsimile apparatus according to claim 5, wherein the indicating signal comprises an CCITT recommendation nonstandard signal NSS, and wherein the confirmation signal comprises a CCITT recommendation nonstandard signal NSF.

7. A facsimile apparatus according to claim 1, wherein the indicating signal comprises a CCITT recommendation nonstandard signal NSS, and wherein the confirmation signal comprises a CCITT recommendation CFR.

8. A facsimile data communication method selectively executing one of a first mode of communicating a protocol signal at a low speed and a second mode of communicating a protocol signal at a high speed for communicating data, said method comprising the steps of:

transmitting a signal indicating the second mode to a destination before starting reception of called terminal identification signal at the low speed in response to a calling instruction;

receiving a confirmation signal, responsive to the indicating signal, from the destination at the low speed; and executing the second mode in response to the confirmation signal.

9. A facsimile data communication method according to claim 8, further comprising the steps of:

receiving a protocol signal relating to the first mode after transmitting the indicating signal; and executing the first mode in accordance with the protocol signal relating to the first mode.

10. A method according to claim 8, wherein the indicating signal comprises a signal indicating polling communication, and wherein the confirmation signal comprises a signal indicating the reception of the polling communication.

11. A method according to claims 10, wherein the indicating signal comprises a CCITT recommendation nonstandard signal NSC, and wherein the confirmation signal comprises a CCITT recommendation nonstandard signal NSF.

12. A method according to claim 8, wherein the indicating signal comprises a CCITT recommendation nonstandard signal NSS, and wherein the confirmation signal comprises a CCITT recommendation CFR.

* * * * *